United States Patent
Elsner et al.

(10) Patent No.: US 6,534,619 B1
(45) Date of Patent: Mar. 18, 2003

(54) METHOD FOR EVAPORATING POLYMER SOLUTIONS OF THERMOPLASTIC POLYMERS

(75) Inventors: Thomas Elsner, Düsseldorf (DE); Jürgen Heuser, Krefeld (DE); Klemens Kohlgrüber, Kürten (DE); Christian Kords, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/762,366

(22) PCT Filed: Jul. 27, 1999

(86) PCT No.: PCT/EP99/05368

§ 371 (c)(1),
(2), (4) Date: Feb. 5, 2001

(87) PCT Pub. No.: WO00/07684

PCT Pub. Date: Feb. 17, 2000

(30) Foreign Application Priority Data

Aug. 7, 1998 (DE) .......................................... 198 35 744

(51) Int. Cl.$^7$ ............................................ C08G 81/02
(52) U.S. Cl. .................... 528/72; 528/481; 528/499; 528/501
(58) Field of Search .................. 526/72; 528/481, 528/499, 501

(56) References Cited

U.S. PATENT DOCUMENTS

| 4,808,262 A | 2/1989 | Aneja et al. | 159/47.1 |
| 5,084,134 A | 1/1992 | Mattiussi et al. | 159/47.1 |
| 5,164,030 A | * 11/1992 | Casper et al. | 159/47.1 |
| 5,256,707 A | * 10/1993 | Casper et al. | 523/318 |
| 5,684,097 A | * 11/1997 | Wulff et al. | 525/63 |

FOREIGN PATENT DOCUMENTS

| DE | 3409066 | 9/1984 |
| EP | 0 150 225 | 12/1987 |
| EP | 0 723 029 | 7/1996 |

* cited by examiner

Primary Examiner—David W. Wu
Assistant Examiner—William Cheung
(74) Attorney, Agent, or Firm—Joseph C. Gil; John E. Mrozinski; Aron Preis

(57) ABSTRACT

This invention relates to a multistep process for evaporating polymer solutions of thermoplastic polymers and for removing volatile constituents from thermoplastic polymers by indirect heat exchange. The invention relates in particular to a process for evaporating volatile constituents out of polymer solutions using shell-and-tube heat exchangers having a special geometry, coiled-tube evaporators and extrusion evaporators.

9 Claims, 2 Drawing Sheets

METHOD FOR EVAPORATING POLYMER SOLUTIONS OF THERMOPLASTIC POLYMERS

FIELD OF THE INVENTION

This invention relates to a multistep process for evaporating polymer solutions of thermoplastic polymers and for removing volatile constituents from thermoplastic polymers by indirect heat exchange. The invention relates in particular to a process for evaporating volatile constituents out of polymer solutions using shell-and-tube heat exchangers, coiled-tube evaporators and extrusion evaporators having a special geometry.

BACKGROUND OF THE INVENTION

The removal of volatile constituents from a polymer solution is one of the final process steps in the preparation of many polymers. The volatile constituents to be removed may be either solvents and/or unpolymerised monomers. Depending upon the degree of viscosity of the polymer solution, several variants of the procedure for removing the volatile constituents from the polymer solution are known, in each of which the polymer solution is heated to above the vaporisation temperature of the volatile constituents. The known apparatus includes, for example, film evaporators, extruders and equipment with indirect heat exchange.

It is crucial that the polymer is not thermally damaged during the heating of the polymer solution. Thermal damage gives rise to unwanted changes in colour or to the presence of specks in the polymer.

Thus EP-A 150 225 describes an apparatus equipped with two serially arranged heat exchangers. The heat exchangers have horizontally arranged rectangular ducts, wherein the polymer solution is degassed. This apparatus is used chiefly for the two-step heating or cooling of viscous polymer solutions during the reaction, but is relatively expensive to manufacture and in operation.

EP-B 226 204 discloses a process and a heat exchanger for removing volatile constituents from a polymer solution containing at least 25 wt. % polymer. The polymer solution is heated in a zone consisting of a multiplicity of ducts in which indirect heat exchange takes place. The ducts have a substantially consistent ratio of surface area to volume, in the range of 0.158 to 1.97 mm-1, a height of 1.27 to 12.7 mm, a width of 2.54 to 10.16 cm and a length of 1.27 to 30.48 cm. The polymer solution is heated in the ducts, at a pressure of 2 to 200 bar, to a temperature above the vaporisation temperature. of the volatile constituents but below the boiling temperature of the polymer. The residence time of the polymer solution in the ducts is 5 to 120 seconds. After the heating, the solution is transferred into a chamber in which at least 25% of the volatile constituents are vaporised out of the solution. The procedure decreases the thermal damage because the time for which the polymer is exposed to elevated temperatures has been decreased. But the process has the disadvantage that a complete removal of the solvent in one step is not possible. Furthermore, deposits of polymer form on the outer surface of the heat-exchanger and in the course of time these carbonise and occasionally flake off, so that the polymer freed from the solvent is contaminated.

EP-B 352 727 discloses a process for removing volatile constituents from polymer solutions by heating the polymer solution, in a multiplicity of parallel ducts, to a temperature above the vaporization temperature of the volatile constituents. The ratio of the heat exchanging surface area to the volumetric flow rate of the product is >80 m$^2$/m$^3$/h. The flow rate in the ducts is <0.5 mm/s and the residence time of the polymer solution in the ducts is 120 to 200 seconds. This process also has the disadvantage that a complete removal of the solvent in one step is not possible. Furthermore, deposits of polymer form on the outer surface of the heat exchanger and in the course of time these carbonise and occasionally flake off, so that the polymer freed from the solvent is contaminated.

The published patent application EP-A 451 602 makes known a process for concentrating polymer solutions, wherein the preheated solution is slowed down in a coiled flow tube and released, and the concentrated solution is further concentrated in a second drying apparatus with self-cleaning elements which is connected immediately downstream. The process has the disadvantage that the final concentration of solvent in the polymer is still comparatively high and that the residence time in the downstream drying apparatus is too long. Particles of polymer, which lower the quality of the product, may collect on the inner walls of the coiled tube.

The object of the present invention is to provide a process for removing volatile constituents from a polymer solution which does not have the disadvantages of the known prior art processes.

This object was achieved by the development and provision of the process according to the invention described in more detail below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
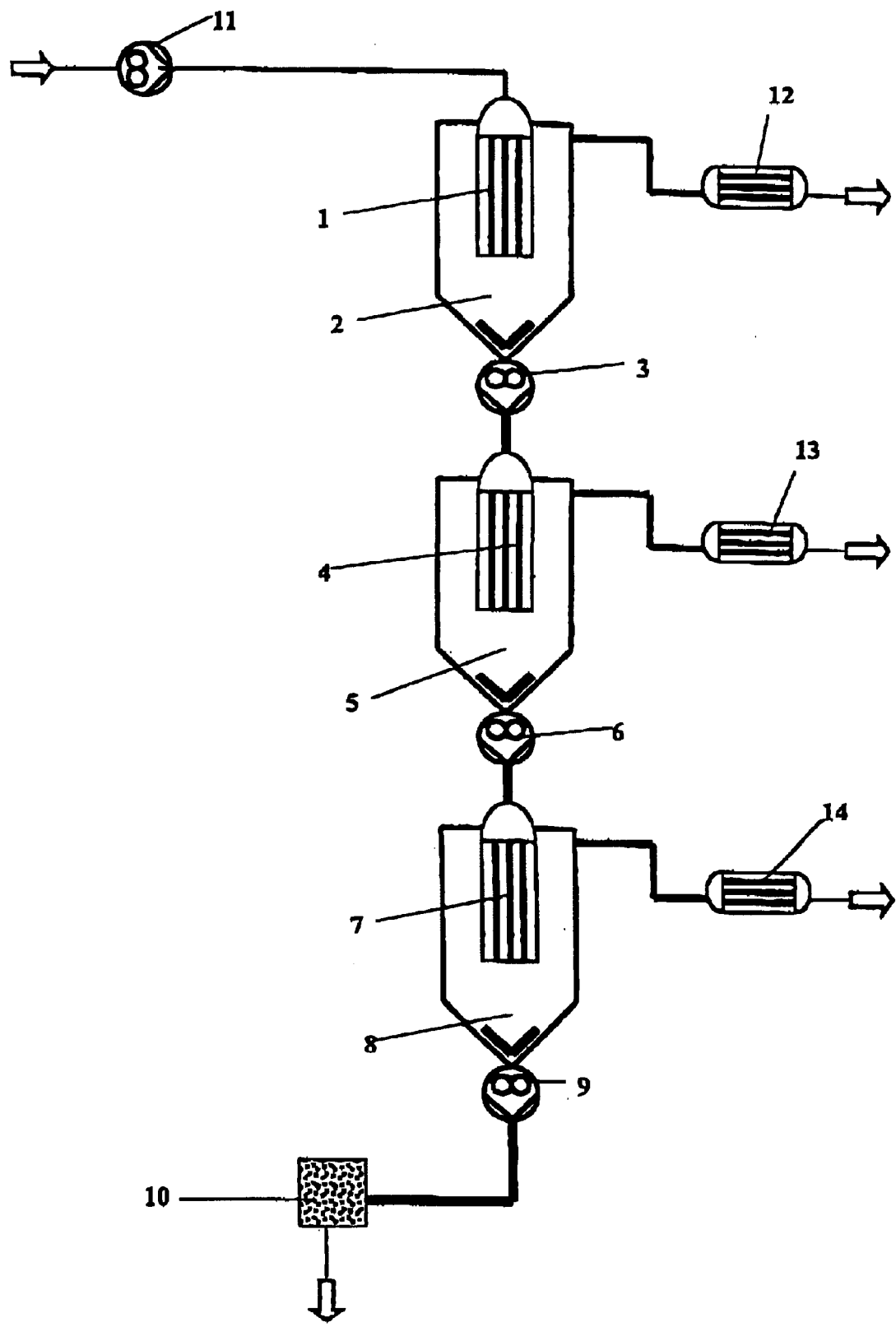
FIG. 1 illustrates an apparatus suitable for carrying out the method of the present invention.

The invention provides a multistep continuous process for evaporating polymer solutions of thermoplastic polymers in particular, by indirect heat exchange, the polymer solution being passed through heat exchangers, in particular shell-and-tube heat exchangers, with a downstream separator, characterized in that A) in a first step, in one or more individual steps, the polymer solution containing 5 to 20 wt. % of polymer is concentrated to 60 to 75 wt. % in a combination of a shell-and-tube heat exchanger and a film evaporator or a coiled-tube evaporator or in a shell-and-tube heat exchanger, in each case with downstream separator, at a temperature of from 150° C. to 250° C., the pressure in the separator being from about 0.1 to 0.4 MPa, preferably ambient pressure (i.e. about 0.1 MPa), B) in a further step, the polymer solution is concentrated from 60 to 75 wt. % to at least 95 wt. %, in particular to 98 to 99.9 wt. %, in a shell-and-tube heat exchanger with downstream separator, at a temperature of from 250° C. to 350° C., the shell-and-tube heat exchanger containing vertical, heated, straight tubes—with or without incorporated static mixers—having an internal diameter of from 5 to 30 mm, preferably of 5 to 15 mm, a length of from 0.5 to 4 m, preferably of 1 to 2 m, and the flow rate per shell-and-tube heat exchanger through the tubes being from 0.5 to 10 kg/h, preferably 3 to 7 kg/h, based on the polymer, and the pressure in the separator being from 0.5 kPa to 0.1 MPa, in particular from 3 kPa to 0.1 MPa, preferably from 3 kPa to 10 kPa, C) in a further step, the rest of the polymer containing solvent and/or other volatile constituents is concentrated to a solvent content and/or content of other volatile constituents of 5 to 500 ppm in a further shell-and-tube heat exchanger with downstream separator or in an extrusion evaporator at a temperature of from 250° C. to 350° C., the shell-and-tube heat exchanger containing vertical, heated, straight tubes having an internal diameter of from 5 to 30 mm, preferably of 10 to 20 mm, a length of from 0.2 to 2 m, preferably of 0.5 to 1 m, and the flow rate per shell-and-tube heat exchanger through the tubes being from 0.5 to 10 kg/h, preferably 3 to 7 kg/h, based on the polymer, and the pressure in the separator being from 50 Pa to 0.1 MPa, preferably from 0.1 kPa to 2 kPa, and D) the degassed polymer is subsequently isolated and optionally granulated.

A preferred process is one wherein the first step is carried out in a shell-and-tube heat exchanger, the tubes of the heat exchanger which contain the polymer solution have an internal diameter of from 5 to 30 mm, preferably of 15 to 25 mm, and a length of from 0.5 to 5 m, preferably of 3 to 4 m, and wherein the flow rate through the tubes of the heat exchanger is 0.5 to 10 kg/h, preferably 0.5 to 3 kg/h, per tube, based on the polymer.

In step A the use of a combination of heat exchanger and coiled-tube evaporator is particularly preferred.

The final degassing in the third step C is carried out preferably in an extrusion evaporator. In this case an extrusion evaporator means a device in which they polymer is heated up and driven out into an evaporation space through a perforated plate or through a manifold having a multiplicity of holes. Here the discharge apertures are so arranged that freely descending or downwardly flowing strands of polymeric material, from which the polymer solvent evaporates, are formed as the result of gravitational forces. The degassed polymer is then discharged at the base of the extrusion evaporator, for example, via a gear pump with a large aperture. The holes have diameters of from 0.5 to 4 mm in particular. The flow rate per hole is preferably from 10 to 1,000 g/h.

The process according to the invention can be employed for removing volatile constituents from solutions of any liquid or meltable polymers and similar substances.

Preferably, however, the process according to the invention is used for degassing thermoplastic polymers. These polymers include all synthetics which are capable of flowing when subjected to pressure and temperature. Examples which may be mentioned here are polycarbonate, polystyrene, polyphenylene sulfide, polyurethane, polyamide, polyester, polyacrylate, polymethacrylate, SAN resin and copolymers thereof. The process is particularly suitable for the isolation and drying of polycarbonate solutions.

Polycarbonates which can be processed particularly advantageously by the process according to the invention include both homopolycarbonates and copolycarbonates. The polycarbonates may be linear or branched in the manner known in principle. Up to 80 mol. %, preferably from 20 mol. % up to 50 mol. %, of the carbonate groups in the appropriate polycarbonates can be replaced by aromatic dicarboxylic ester groups. Such polycarbonates, which contain both acidic groups of carbonic acid and acidic groups of aromatic dicarboxylic acids incorporated into the molecular chain are, strictly speaking, aromatic polyester carbonates. They are to be subsumed under the general term thermoplastic, aromatic polycarbonates.

Details regarding the preparation of polycarbonates are disclosed in many patent specifications. Here, by way of example, reference is made only to Schnell, "Chemistry and Physics of Polycarbonates", Polymer Reviews, Volume 9, Interscience Publishers, New York, London, Sydney, 1964; to D.C. PREVORSEK, B. T. DEBONA and Y. KESTEN, Corporate Research Center, Allied Chemical Corporation, Morristown, N.J. 07960, "Synthesis of Poly(ester carbonate) Copolymers" in Journal of Polymer Science, Polymer Chemistry Edition, Vol. 19, 75–90 (1980); to D. Freitag, U. Grigo, P. R. Müller, N. Nouvertne, Bayer A G, "Polycarbonates" in Encyclopedia of Polymer Science and Engineering, Volume 11, Second Edition, 1988, pages 648–718 and finally, to Dres. u. Grigo, K. Kircher and P. R. Müller, "Polycarbonate", in Becker/Braun, Kunststoff-Handbuch, Volume 3/1, Polycarbonate, Polyacetale, Polyester, Celluloseester, Carl-Hanser Verlag, Munich, Vienna 1992, pages 117–299.

The process according to the invention is used particularly preferably for the treatment of thermoplastic polycarbonates having an average molecular weight $M_v$ (determined by measuring the relative viscosity at 25° C. in $CH_2Cl_2$ and at a concentration of 0.5 g per 100 ml $CH_2Cl_2$) of 12,000 to 400,000, preferably of 18,000 to 80,000 and in particular of 22,000 to 60,000.

The volatile constituents apart from the solvent may be both unpolymerized monomers or oligomers and other low-molecular educts. A solvent frequently used in the preparation of thermoplastic polymers, in particular of polycarbonate, is methylene chloride or a mixture of methylene chloride and chlorobenzene.

The polymer freed from solvent by the process has a viscosity in particular of 100 to 5000 Pas in the molten state.

The heat exchangers, in particular the shell-and-tube heat exchangers, contain any device, known in principle to the person skilled in the art, whereby the ducts or pipes conveying the polymer solution may be heated to a temperature above the vaporization temperature of the volatile constituents. Examples of these devices are resistance heaters or a distribution network for the transport of a heat-exchanging fluid.

All the parts with which the polymer solution comes into contact in the course of the process according to the invention, in particular the heat exchanger or the shell-and-tube heat exchanger, may be manufactured from any metallic material. Nevertheless it is preferable that these parts, in particular the heat exchangers, be manufactured from a material low in iron and having an iron content of 10% at most. Most preferably, all parts of the heat exchangers which come into contact with the product are manufactured from alloy 59 (2.4605), Inconell 686 (2.4606), alloy B2, alloy B3, alloy B4, alloy C22, alloy C276, alloy C4 or alloy 625.

The invention also provides granulated polymers obtainable by the process according to the invention.

A preferred granulated polymer is made from a dried polymer solution, in particular polycarbonate solution, obtainable by the process according to the invention, with a content of residual solvents and monomers of at most 100 ppm, preferably at most 55 ppm, particularly preferably at most 30 ppm.

A particularly preferred granulated polymer is one wherein the monomer is bisphenol A and its content in the polymer is at most 5 ppm, preferably at most 2 ppm, particularly preferably at most 1 ppm.

A most preferred granulated polymer is one wherein the residual solvent is methylene chloride and/or chlorobenzene and its content in the polymer is at most 95 ppm, preferably at most 50 ppm, particularly preferably at most 25 ppm.

The invention is illustrated below by way of example with the aid of FIGS. 1 and 2, which show diagrams of two suitable arrangements for carrying out the process.

EXAMPLES

The process according to the invention is exemplified by the diagram of the process shown in FIG. 1. A pump 11, for example, a gear pump, centrifugal pump or screw pump, delivers the 5 to 20% polymer solution through a shell-and-tube heat exchanger 1 into the bottom of a separator 2. The more volatile constituents are separated off in the separator and condensed in a condenser 12. A further gear pump 3 delivers the condensed polymer solution (60 to 75 wt. % polymer) through a second shell-and-tube heat exchanger 4 into the bottom of the second separator 5. The more volatile constituents are condensed in the condenser 13. A further gear pump 6 delivers the 95 to 99.9 wt. % polymer solution through a third shell-and-tube heat exchanger 7 into the third separator 8. Here the more volatile constituents are condensed in the condenser 14. The degassed polymer melt is passed via a gear pump 9 to a granulator 10.

Example 1

In this Example, a 15 wt. % polycarbonate solution obtained from a polycarbonate preparation process using BPA as polymer together with 42 wt. % chlorobenzene and 43 wt. % methylene chloride was concentrated in three steps (FIG. 1) by means of three shell-and-tube heat exchangers 1, 4, 7 arranged one behind the other and their respective associated separators 2, 5, 8. In the first step, the polycarbonate solution was heated to 200° C. in the first shell-and-tube heat exchanger 1. The tubes were 20 mm in diameter and 4 m in length and were manufactured from alloy 59. The flow rate per tube was 1 kg/h. The pressure in the associated separator 2 was 0.1 MPa. The polymer solution issuing from the separator contained 65 wt. % polycarbonate.

In the second step, the polycarbonate solution was heated to 300° C. in the shell-and-tube heat exchanger 4. The tubes were 10 mm in diameter and 2 m in length and were manufactured from alloy 59. The flow rate per tube was 5 kg/h. The pressure in the associated separator 5 was 0.1 MPa. The polymer solution issuing from the second separator 5 contained 98.5 wt. % polycarbonate.

In the third step, the polycarbonate solution was heated to 320° C. in the third shell-and-tube heat exchanger 7. The tubes of the shell-and-tube heat exchanger were 20 mm in diameter and 0.5 m in length and were manufactured from alloy 59. The flow rate per tube was 5 kg/h. The pressure in the associated third separator 8 was 0.1 kPa.

The degassed polycarbonate of the polymer melt issuing from the third separator contained 50 ppm of volatile constituents and residual solvents (substantially chlorobenzene).

After discharge from the third separator 8, the polycarbonate melt was directly converted into granules in a granulator 10. The polycarbonate had a solution viscosity $\eta_{rel}$ of 1.29 (measured at 25° C. in methylene chloride at a concentration of 5 g/l).

Example 2

In this Example, a 15 wt. % polycarbonate solution containing 42 wt. % chlorobenzene and 43 wt. % methylene chloride was concentrated in three steps.

In the first step, the polycarbonate solution was heated to 200° C. in the first shell-and-tube heat exchanger 1. The tubes were 10 mm in diameter and 4 m in length and were manufactured from alloy 59. The shell-and-tube heat exchanger 1 was operated at a pressure of 20 bar. A coiled-tube evaporator (not shown), which was heated with superheated steam (1.6 MPa), was arranged downstream of the shell-and-tube heat exchanger 1. The pressure in the downstream separator 2 was 0.1 MPa.

In the second step, the polycarbonate solution was heated to 300° C. in the shell-and-tube heat exchanger 4. The tubes were 10 mm in diameter and 2 m in length and were manufactured from alloy 59. The flow rate per tube was 5 kg/h. The pressure in the associated separator 5 was 5 kPa.

In the third step, the polycarbonate solution was heated to 320° C. in the shell-and-tube heat exchanger 7. The tubes of the shell-and-tube heat exchanger were 20 mm in diameter and 0.5 m in length and were manufactured from alloy 59. The flow rate per tube was 5 kg/h. The pressure in the associated separator 8 was 0.1 kPa.

The degassed polycarbonate had a chlorobenzene content of 50 ppm.

Example 3

Again in this Example, a 15 wt. % polycarbonate solution containing 42 wt. % chlorobenzene and 43 wt. % methylene chloride was concentrated in three steps.

In the first step, the polycarbonate solution was heated to 200° C. in the first shell-and-tube heat exchanger 1. The tubes were 10 mm in diameter and 4 m in length and were manufactured from alloy 59. The shell-and-tube heat exchanger 1 was operated at a pressure of 20 bar. A coiled-tube evaporator (not shown), which was heated with superheated steam (1.6 MPa), was arranged downstream of the shell-and-tube heat exchanger 1. The pressure in the downstream separator 2 was 0.1 MPa.

In the second step, the polycarbonate solution was heated to 300° C. in the shell-and-tube heat exchanger 4. The tubes were 10 mm in diameter and 2 m in length and were manufactured from alloy 59. The flow rate per tube was 5 kg/h. The pressure in the associated separator 5 was 5 kPa.

In the third step, in contrast to Example 2, the polycarbonate solution was freed from residual volatile constituents at a temperature of 320° C. in an extrusion evaporator 24 (compare also FIG. 2), which was equipped with a manifold for the distribution of the polycarbonate melt. The manifold in turn had more than 1000 holes of 1 mm in diameter and produced a multiplicity of strands of polymer of 6 m in length, the flow rate per strand being 70 g/h. All parts of the unit which come into contact with the product were manufactured from alloy 59. The purified polymeric material was removed at the base of the extrusion evaporator and further processed. The pressure in the associated separator 15 was 0.1 kPa.

The degassed polycarbonate had a chlorobenzene content of 25 ppm.

Example 4

Figure 2:
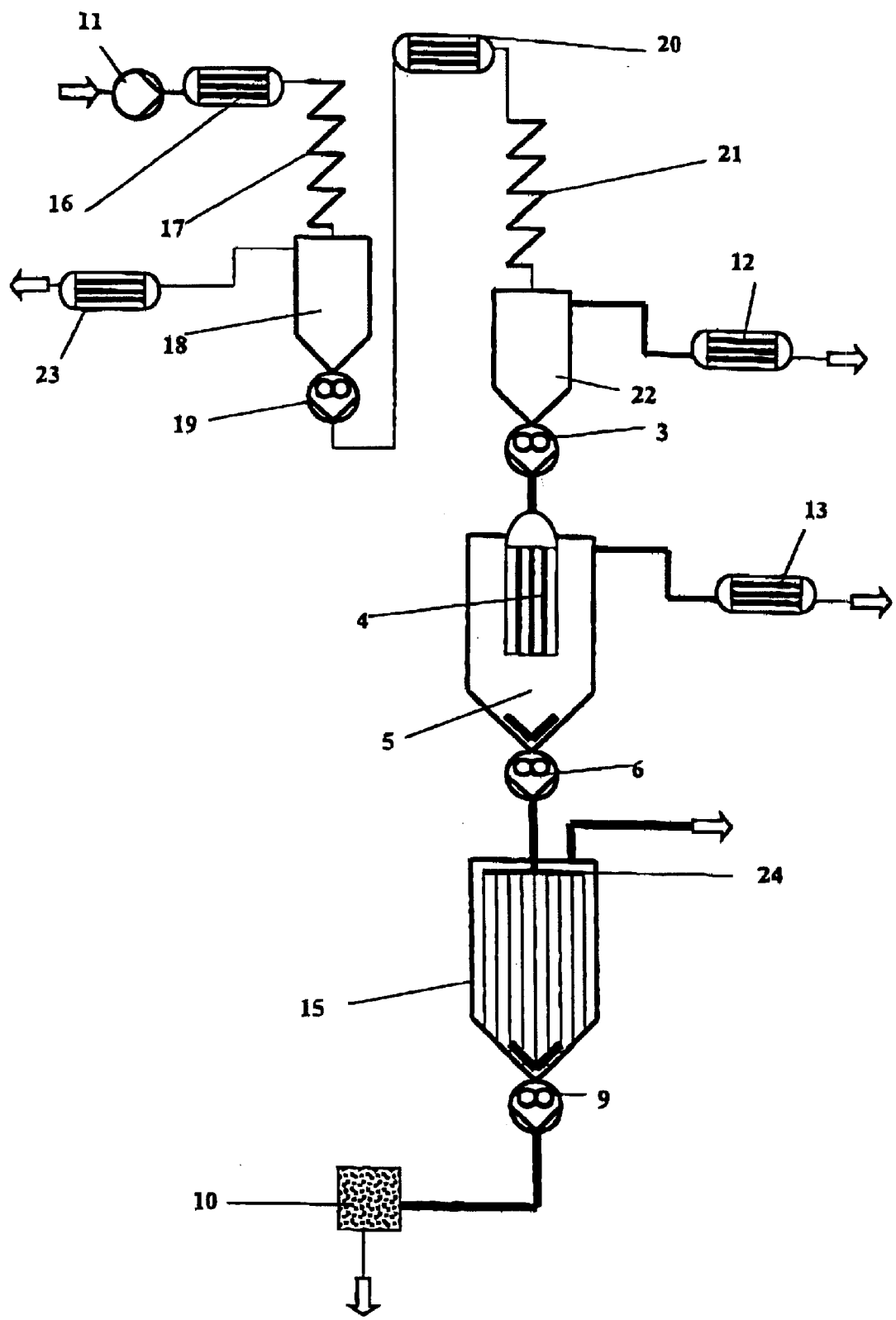
FIG. 2 illustrates a second apparatus suitable for carrying out the method of the present invention.

A general example of a variant of the process is presented by the diagram of the procedure in FIG. 2. A pump 11, a screw pump, delivers the 5 to 20% polymer solution in two steps through a combination of heat exchanger 16 and coiled-tube evaporator 17 into the bottom of a separator 18. The more volatile constituents are separated off in the separator 18 and condensed in a condenser 23. A further gear pump 19 delivers the solution through a second heat exchanger 20 followed by a second coiled-tube evaporator 21 into the separator 22 while the volatile constituents are deposited in the condenser 12. The next gear pump 3 delivers the concentrated polymer solution (60 to 75 wt. % polymer) through a shell-and-tube heat exchanger 4 into the bottom of the third separator 5. The more volatile constituents are condensed in a condenser 13. A further gear pump 6 delivers the 95 to 99.9 wt. % polymer solution through a manifold 24—which produces a multiplicity of thin strands of polymer of 1 mm in diameter—into the fourth separator 8. Here the more volatile constituents are withdrawn by suction. The degassed polymer melt is passed via a gear pump 9 to a granulator 10.

A 15 wt. % polycarbonate solution obtained from a polycarbonate preparation process using BPA as polymer together with 42 wt. % chlorobenzene and 43 wt. % methylene chloride was concentrated in four steps (corresponding to FIG. 2) by means of the procedure described above. In the first two steps, the polycarbonate solution was heated in the heat exchangers 16 and 20 to temperatures of 170° C. and 220° C. respectively. The tubes of the heat exchangers 16, 20 were 10 mm in diameter and 4 m in length and were manufactured from alloy 59 (heat exchanger 16) and Inconell 686 (heat exchanger 20). The pressure in the associated separator 18 was 0.14 MPa and the pressure in the separator 22 was 0.35 MPa. The polymer solution issuing from the separator 22 contained 65 wt. % polycarbonate.

In the third step, the polycarbonate solution was heated to 300° C. in the shell-and-tube heat exchanger 4. The tubes were 10 mm in diameter and 2 m in length and were manufactured from alloy 59. The flow rate per tube was 5 kg/h. The pressure in the associated separator 5 was 0.1 MPa. The polymer solution issuing from the second separator 5 contained 98.5 wt. % polycarbonate.

In the fourth step, the polycarbonate solution was admitted into the separator 15 via a manifold 24 containing 1 mm holes for the production of a multiplicity of strands of polymer having a high surface area for the exchange of materials. The separator 15 and the pipes which came into contact with the product were manufactured from alloy 59. The pressure in the associated fourth separator 15 was 0.1 kPa.

The degassed polycarbonate of the polymer melt issuing from the fourth separator 15 contained 50 ppm of volatile constituents and residual solvents (substantially chlorobenzene).

After discharge from the fourth separator 15, the polycarbonate melt was directly converted into granules in a granulator 10. The granulated polycarbonate had a solution viscosity $\eta_{rel}$ of 1.29 (measured at 25° C. in methylene chloride at a concentration of 5 g/l).

The residual content of bisphenol A (BPA) in the granulated polycarbonate was approximately 5 ppm, as measured by gas chromatography.

Example 5

The same procedural sequence and device were used as in Example 4, but the pressure in the separator 5 was lowered to 5 kPa.

As a result of this measure, granulated polycarbonate having a residual BPA content of only 2 ppm was obtained from the overall process. The chlorobenzene content was 50 ppm.

Example 6

With the same procedure as in Example 5, but with a pressure of 3 kPa in the separator 5, a polycarbonate having a residual BPA content of 1 ppm was obtained. The chlorobenzene content was 25 ppm.

What is claimed is:

1. A multi-step continuous process for evaporating polymer solutions of thermoplastic polymers by indirect heat exchange, the polymer solution being passed through a drying device, the process comprising A) concentrating a polymer solution containing 5 to 20 wt. % of polymer to produce a solution containing polymer in an amount of 60 to 75 wt. % in a combination of a member selected from the group consisting of a shell-and-tube heat exchanger, a film evaporator and a coiled-tube evaporator with in each case with a downstream separator, at a temperature of 150° C. to 250° C., the pressure in the separator being from about 0.1 to 0.4 MPa, B) concentrating the solution produced in A) to produce a solution that contains at least 95 wt. %, polymer in a shell-and-tube heat exchanger and a downstream separator, at a temperature of 250° C. to 350° C., the shell-and-tube heat exchanger containing vertical, heated, straight tubes—with or without incorporated static mixers—said tubes having an internal diameter of 5 to 30 mm, a length of 0.5 to 4 m, and the flow rate through the tubes being 0.5 to 10 kg/h, based on the polymer, and the pressure in the separator being 0.5 kPa to 0.1 MPa, C) concentrating the polymer solution obtained in B) to bring the content of solvent and/or other volatile constituents to 5 to 500 ppm in a shell-and-tube heat exchanger with downstream separator or in an extrusion evaporator with separator at a temperature of 250° C. to 350° C., the shell-and-tube heat exchanger containing vertical, heated, straight tubes having an internal diameter of 5 to 30 mm, a length of from 0.2 to 2 m, and the flow rate through the tubes being from 0.5 to 10 kg/h, based on the polymer, and the pressure in the separator 15 being from 0.05 kPa to 0.1 kPa, and D) isolating the product of C) and optionally granulating the isolated product to obtain a granulated polymer.

2. The process of claim 1 wherein A) is carried out in a shell-and-tube heat exchanger, having tubes having internal diameter of 5 to 30 mm, and a length of 0.5 to 5 m, and the flow rate through the tubes of the heat exchanger is 0.5 to 10 kg/h, per tube, based on the polymer.

3. A multi-step continuous process for evaporating polymer solutions of thermoplastic polymers by indirect heat exchange, the polymer solution being passed through a drying device, the process comprising:

A) concentrating a polymer solution containing 5 to 20 wt. % of polymer to produce a solution containing polymer in an amount of 60 to 75 wt. % in a combination of a heat exchanger and a coiled-tube evaporator with a downstream separator, the heat exchanger contains heat-exchanging tubes which have an internal diameter of 5 to 30 mm, and a length of 0.5 to 5 m and the flow rate through the tubes is 0.5 to 70 kg/h, per tube, based on the polymer, at a temperature of 150° C. to 250° C., the pressure in the separator being from about 0.1 to 0.4 MPa, B) concentrating the solution produced in A) to produce a solution that contains at least 95 wt. %, polymer in a shell-and-tube heat exchanger and a downstream separator, at a temperature of 250° C. to 350° C., the shell-and-tube heat exchanger containing vertical, heated, straight tubes—with or without incorporated static mixers—said tubes having an internal diameter of 5 to 30 mm, a length of 0.5 to 4 m, and the flow rate through the tubes being 0.5 to 10 kg/h, based on the polymer, and the pressure in the separator being 0.5 kPa to 0.1 MPa, C) concentrating the polymer solution obtained in B) to bring the content of solvent and/or other volatile constituents to 5 to 500 ppm in a shell-and-tube heat exchanger with downstream separator or in an extrusion evaporator with separator at a temperature of 250° C. to 350° C., the shell-and-tube heat exchanger containing vertical, heated, straight tubes having an internal diameter of 5 to 30 mm, a length of from 0.2 to 2 m, and the flow rate through the tubes being from 0.5 to 10 kg/h, based on the polymer, and the pressure in the separator 15 being from 0.05 kPa to 0.1 kPa, and D) isolating the product of C) and optionally granulating the isolated product to obtain a granulated polymer.

4. The process of claim 1, wherein A) is carried out in two successive combinations of heat exchangers and coiled-tube evaporators, each with a downstream separator.

5. The process of claim 1, wherein all parts of the drying device which come into contact with the polymer solution or with the molten polymer in steps A), B) and C) are made of material having low iron content.

6. The process of claim 1, wherein the polymer is at least one member selected from the group consisting of polycarbonate, polystyrene, polyphenylene sulfide, polyurethane, polyamide, polyester, polyacrylate, polymethacrylate and styrene acrylonitrile copolymer.

7. The process of claim 1, wherein the polymer solution contains a solvent selected from the group consisting of methylene chloride and a mixture of chlorobenzene and methylene chloride.

8. Process according to claim 5, wherein the material which is low in iron has an iron content of 10% at most.

9. Process according to claim 5, wherein the material which is low in iron is selected from among: alloy 59 (2.4605), Inconell 686 (2.4606), alloy B2, alloy C22, alloy C276, alloy C4, alloy B2, alloy B3, alloy B4, preferably alloy 59.

* * * * *